(12) United States Patent
Kirkman et al.

(10) Patent No.: US 6,895,995 B2
(45) Date of Patent: May 24, 2005

(54) LIQUID FLOW REGULATOR

(75) Inventors: Douglas F Kirkman, Ickenham (GB); Matthew H Tibbitts, Windsor (GB)

(73) Assignee: KOP Limited, Berkshire (GB)

(*) Notice: Subject to any disclaimer, the term of this patent is extended or adjusted under 35 U.S.C. 154(b) by 180 days.

(21) Appl. No.: 10/243,747

(22) Filed: Sep. 16, 2002

(65) Prior Publication Data

US 2003/0051754 A1 Mar. 20, 2003

(30) Foreign Application Priority Data

Sep. 19, 2001 (GB) ............................................. 0122552

(51) Int. Cl.⁷ .............................................. G05D 7/06
(52) U.S. Cl. ..................................................... 137/501
(58) Field of Search ................................ 137/501, 503, 137/505.14

(56) References Cited

U.S. PATENT DOCUMENTS

| | | | | |
|---|---|---|---|---|
| 436,235 A | * | 9/1890 | Griffin | 137/495 |
| 2,881,793 A | * | 4/1959 | Lee | 137/501 |
| 3,177,892 A | * | 4/1965 | Grandstaff | 137/501 |
| 3,818,921 A | * | 6/1974 | Peczkowski | 137/501 |
| 3,865,014 A | * | 2/1975 | van der Kolk | 91/417 R |
| 4,245,669 A | * | 1/1981 | Schmidt | 137/550 |
| 4,265,270 A | * | 5/1981 | Satoh | 137/505.39 |
| 4,310,050 A | * | 1/1982 | Bourgoyne, Jr. | 166/318 |
| 4,422,470 A | * | 12/1983 | Jackson et al. | 137/501 |
| 4,629,561 A | * | 12/1986 | Shirato et al. | 137/501 |
| 4,648,423 A | * | 3/1987 | Henken | 137/494 |
| 4,893,649 A | | 1/1990 | Skoglund | |

FOREIGN PATENT DOCUMENTS

| | | |
|---|---|---|
| GB | 2296984 A | 7/1996 |
| GB | 2333863 A | 8/1999 |

* cited by examiner

Primary Examiner—Stephen M. Hepperle
(74) Attorney, Agent, or Firm—Nixon & Vanderhye P.C.

(57) ABSTRACT

A flow regulator particularly for sub-sea chemical injection at low continuous rates includes a piston moveable in response to differential pressure and controlling via a lever connection an inlet valve. The differential pressure is balanced by a dual rate spring assembly which is positionally adjustable by means of a screw-threaded adjusting rod.

23 Claims, 1 Drawing Sheet

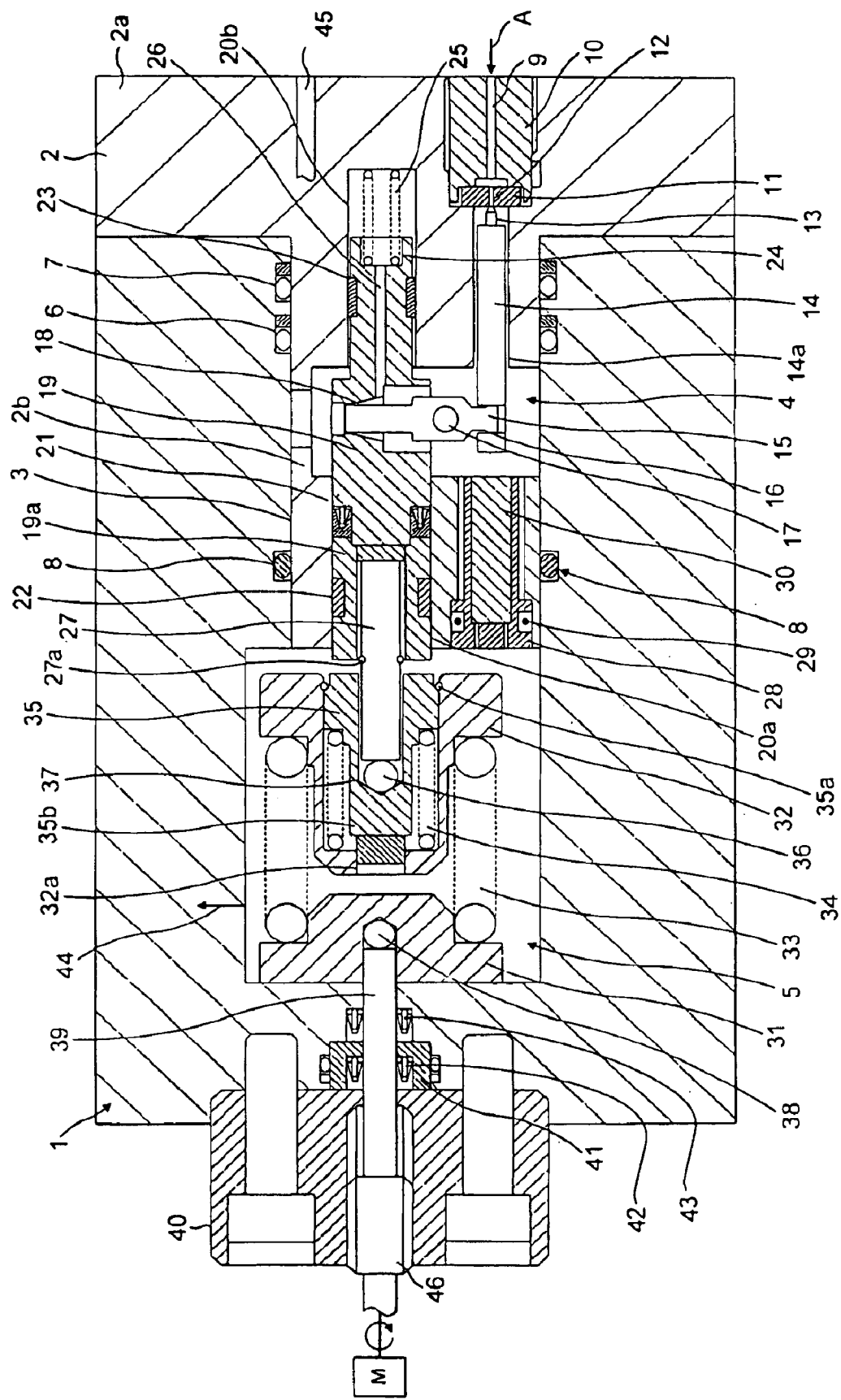

LIQUID FLOW REGULATOR

FIELD OF THE INVENTION

The present invention relates to a liquid flow regulator and more particularly to a flow regulator which is intended to provide a substantially constant flow rate of pressurised liquid.

BACKGROUND TO THE INVENTION

It is known, for example from U.S. Pat. No. 4,893,649, to provide a fluid flow regulator in which a spring biased piston is disposed between two chambers of which a first is connected to an inlet and a second is connected to an outlet by way of a valve of which a closure member, such as a valve needle, is carried, typically with an intermediate spring, by the piston, there being a flow passage between the first and second chambers. The piston responds to a pressure difference between the chambers so that it tends to close the valve in response to a relative increase in pressure at the inlet. Adjustment of the flow rate may be achieved by positional adjustment of the valve seat. Flow regulators of this general type regulate the flow by means of a spring-bias or load that balances the pressure difference. A change in the pressure difference is counteracted by a change in the spring-load. The flow rate varies as the square root of the pressure difference across a fixed orifice.

As will be explained more particularly later, a difficulty in the design of flow regulators which need to provide continuous flow at very low rates (particularly for chemical injection sub-sea) is conflict between a need for a small control orifice and avoidance of clogging by particles, as well as the provision of a substantial 'turn-down ratio' i.e. the ratio of the maximum to the minimum flow rate. An object of the invention is to provide an improved regulator in this context.

SUMMARY OF THE INVENTION

The present invention relates to a novel construction of liquid flow regulator, in which an 'upstream' or inlet flow control valve is positionally adjusted in response to movement of a piston which responds to a difference in pressure between two chambers which are connected by a flow passage. The piston is preferably connected by way of a lever to operate the valve and preferably also the adjustment of the flow rate is performed by adjustment of the position of an abutment member constituting a datum for a spring loading that opposes the force developed by the pressure difference, i.e. resists movement of the piston in a sense for closing the valve. In a preferred construction this abutment member is adjustable by means of an adjusting screw which may be driven by, for example, an electrical stepper motor.

A preferred feature of the regulator is a varying-rate resilient load (e.g. a high-rate spring in series with a low-rate spring) for the piston.

Further features of the invention will be apparent from the following description with reference to the accompanying drawing.

BRIEF DESCRIPTION OF THE DRAWINGS

The single FIGURE illustrates in sectional view a flow regulator according to the invention.

DETAILED DESCRIPTION OF A PREFERRED EMBODIMENT

The single FIGURE illustrates a flow regulator which comprises a body principally composed of a main body part 1, which is in a generally hollow cylindrical form, and an end cap 2 comprising an end wall 2a abutting the main body part 1 and a central boss 2b which extends into a bore 3 within the main body part 1. The bore 3 defines a first chamber 4 which, as will be more particularly described later, is connected to an inlet for hydraulic fluid pressure by way of a regulating valve. The bore 3 in the main body part 1 leads to a second chamber 5, downstream of the first chamber 4. Again, as will be explained later, a piston is moveable in response to a difference in pressure between the chambers 4 and 5 and is arranged to operate the aforementioned regulating valve such that an excess pressure in chamber 4 over the pressure in chamber 5 tends to move the piston in a sense which will cause closure of the inlet regulating valve.

The flow regulator needs to be operative so that it maintains the flow setting accurately notwithstanding varying inlet and outlet pressures. Accordingly, it is basically a pressure regulator with an inline orifice. The pressure drop across the inline orifice is sensed by a sensing piston in the pressure regulator so as to provide the flow control. The following description includes the features of the inline orifice between the chambers 4 and 5, the regulating valve and its operation by the piston, and the means for applying a varying rate spring force which resists the movement of the piston in the sense which causes closure of the inlet regulating valve and thereby balances the differential pressure.

Sealing between the chamber 4 defined within the boss 2b is provided by dual O-ring seals 6 and 7 disposed between main body part 1 and the boss 2b. Sealing between the chamber 4 and the chamber 5 is provided by an O-ring seal 8 accommodated within an internal annular recess in the body part 1 and engaging the exterior surface of the boss 2b.

Liquid, such as selected chemicals in liquid form, under pressure and intended to flow into the regulator in the direction of an arrow A is fed to a passage 9 extending axially of a screw threaded insert 10 in the end cap 2. The insert 10 has an inner, recessed end which retains in position a valve seat 11 which has a control orifice 12 that receives, and can be closed off by, a conical valve poppet 13 supported by a valve stem 14 supported in a bore 14a in the boss part 2b of end cap 2. One common requirement is for very low flow rates (to reduce the chemical storage requirement on an oil platform). These rates may change during the life of a well but the flow is continuous. The specification requires a small control orifice, typically less than 0.5 mm diameter is envisaged. The chemicals can only be supplied to certain cleanliness standards. The high quantities of small particles make the subsea filters prone to clogging hence the need for the valve to be able to digest the largest possible particle size. Any design with a control pin passing through the orifice reduces the digestible particle size by more than 50%.

The full flow from a poppet and seat is achieved when a poppet lifts ¼ the orifice diameter for a flat-ended poppet and ½ the orifice diameter for a conical poppet, typically 0.2 mm. At the minimum flow setting with a 15/1 turn down ratio valve the valve poppet lift would only be 0.013 mm. This would only pass a 13-micron spherical particle, which would not usually be filtered out. With the valve controlling at this minimum setting the poppet and seat would gradually silt up, this would tend to reduce the differential pressure and the piston would move to open the valve and maintain the flow constant. Ultimately the valve opens sufficiently for the silt to be digested and the valve reverts to its minimum setting.

The end of the stem 14 remote from the poppet 13 protrudes into the first chamber 4. The valve stem 14 is moveable by means of a lever 15 of which one end engages a transversely directed slot 16 in the valve stem 14. The lever 15 has a pivot 17 intermediate its ends; the pivot is supported in the boss 2b. The other end of the lever 15 is received in a tapered transversely extending slot 18 within a piston 19 that slides within aligned axial bores 20a and 20b in the boss 2b. A case 19a forming the left-hand end of the piston 19 traps a U-seal 21 so as to form a piston assembly which slides in the boss part of the end cap. Two bushes 22 and 23 ensure smooth sliding of the piston in the bores 20a and 20b respectively.

The lever connection facilitates the configuration of the regulator, i.e. with the valve in the upstream or inlet passage. Moreover, it provides a means of positively lifting the valve. The valve may therefore have a simple circular orifice, rather than an annular orifice characteristic of upstream control valves.

The lever preferably performs a control gain, having (for example) an arm ratio of 0.4:1, so that the control piston's movement increases relative to the lifting movement of the valve, and loads arising from the flow media on the piston are reduced, enabling the use of a lower force seating spring. The lever allows a 'parallel' in-line design with small internal diameters so that high pressures can be handled by a small size unit. Omission of the lever (so that the piston would be directly connected to the inlet valve) would forego the control gain and compactness of design. Between the bottom end of the bore 20b and a recess 24 in the adjacent end of the piston is a spring 25 which in the absence of spring loading of the piston 19, as will be described, urges the piston 19 in the sense which, by virtue of the operation of the lever 15, will close the regulating valve constituted by poppet 12 and valve seat 11. The chamber formed between the recessed end of piston 19 and the end cap 2 is connected by way of passage 26 through the piston to the chamber 4, so that there is no hydraulic lock created in the space between piston 19 and end cap 2.

Disposed in a longitudinal screw threading of the piston casing is a screw-threaded spigot 27 secured against rotation by a spring clip 27a.

Between the chambers 4 and 5 is disposed, as previously mentioned, an inline orifice constituted by a screw 28 sealed relative to end cap 2b by an O-ring seal 29. The screw contains a fixed orifice constituted, in this embodiment, by a multi-stage flow restrictor 30. The differential pressure to which the piston 19 responds is in essence the pressure drop across the fixed orifice 30 between chambers 4 and 5.

The orifice may be constituted by a single passageway or multiple passageways.

Within the chamber 5, in this embodiment, are disposed most of the components by means of which the piston 19 is provided with a resilient or spring load resisting movement of the piston in the direction for closing the inlet regulating valve (i.e. balancing the force due to the pressure difference between the chambers), so as to determine a set value for the flow rate.

Abutting the left-hand or upper end of the chamber 5 is a first spring guide 31 which faces a second spring guide 32, there being a high rate compression spring 33 disposed between the spring guides 31 and 32. The guide 32 provides a datum for a lower rate compression spring 34 disposed between an internal shoulder of the guide 32 and an inner spring guide 35 which at one end is slidingly supported in spring guide 32 and at its other end, adjacent the piston, is slidingly supported in the guide 32 and also receives the spigot 27 which constitutes an extension of the piston 19. Thereby springs 33 and 34 are in series. A spring clip 35a retains the inner guide 34 within the spring guide 32. The guide 35 contains a ball 36 disposed in a seat 37 and engaging the end of the spigot 27. The purpose is to avoid friction as the guide 35 tends to rotate. The first guide 31 contains in a similar manner a ball 38 disposed between this guide and an adjustment datum constituted by a screw-threaded rod 39 which in this embodiment is used to apply through the intermediary of the spring assembly an adjustable load on the piston 19.

The (left-hand) end of guide 35 slides in a bore 32a in guide 32. The inner rim of this bore 32a constitutes an end stop for the guide 35, such that shoulder 35b engages the guide 35 before the low-rate spring is fully compressed (i.e. reaches a coil-bound state). During compression of the low-rate spring the high-rate spring hardly moves, but this high-rate spring will act significantly when the differential pressure is high enough to move (by means of the piston 19) the guide 35 against its end stop. The engagement of guide 32 with guide 31 should occur before the high-rate spring is fully compressed.

At the left-hand or upper end of the body part 1 is a clamping nut 40 which retains a holder 41 maintaining in place U-seals 42 and 43 which provide sealing, but allow movement, between the rod 39 and the body 1. The chamber 5 has an outlet, schematically illustrated by the arrow 44; this outlet may be taken in any particular direction, either directly through the body 1 or by way of the body 1 and a bore 45 in the end cap 2 to the exterior.

The threaded push rod is supported in a threaded bush 46 within the clamping nut and is moveable by means of an electric stepper motor M in a neighbouring chamber (not shown).

In the operation of the flow regulator, the motor M may be employed to adjust the spring load on the piston assembly to zero. The bias spring 25 acts on the piston 19 and by way of the lever arm 15 to stop fluid flow by means of valve 12 and the seat 11. When fluid flow is required, the stepper motor M is driven to adjust the spring load to overcome the load represented by spring 25. The consequent movement of piston 19 in the downward or rightwards direction as shown in the FIGURE opens the inlet regulating valve.

In the presence of fluid flow, pressure in the chamber 4 acts upon the piston and also flows through the inline orifice, namely the restrictor 30, into the chamber 3. The pressure difference between chambers 4 and 5 provides a net force on the sensing piston 19 to provide regulation of the fluid flow by virtue of the regulating valve 13.

The main purpose of the two-rate spring assembly is to provide a constant force increase for each step of the motor M, so that the pressure drop between chambers 3 and 4 is controlled in constant steps of pressure. The hydraulic flow is proportional to the square root of the pressure drop between the chambers 4 and 5 so that an initial opening step flow is coarsely regulated. If there were 100 steps of adjustment, a single rate spring, causing the delta pressure to increase linearly in each step, the turn-down ratio would be 10:1. However, the use of the low-rate spring as well as the high rate spring allows additional control steps before the valve would otherwise have opened, thereby increasing the turn-down ratio. Typically the high-rate spring 33 may require 200 newtons per mm of compression and the low-rate spring may require 18 newtons per mm of compression, i.e. there is an order of magnitude in the ratio of the spring rates.

What is claimed is:

1. A liquid flow regulator including:
first and second chambers and a flow passage connecting said chambers;
a piston responsive to differential pressure between said chambers to move in a valve-closing direction in response to excess pressure in the first chamber over pressure in the second chamber;
a bias member urging said piston to move in said value-closing direction;
a varying rate resilient load opposing movement of said piston in said valve-closing direction;
a positionally adjustable datum member for said resilient load;
a motor coupled to move said positionally adjustable datum member;
an inlet passage coupled to said first chamber;
a regulating valve which is controlled by the piston and is disposed in said inlet passage upstream of the first chamber; and
a lever connection between said piston and said regulating valve.

2. A flow regulator as in claim 1 wherein said resilient load provides an initial low spring rate and a subsequent higher spring rate.

3. A flow regulator including
first and second chambers and a flow passage connecting said chambers;
a piston responsive to differential pressure between said chambers to move in a valve-closing direction in response to excess pressure in the first chamber over pressure in the second chamber;
a bias member urging said piston to move in said valve-closing direction;
a varying rate resilient load opposing movement of said piston in said valve-closing direction;
a positionally adjustable datum member for said resilient load;
a motor coupled to move said positionally adjustable datum member;
an inlet passage coupled to said first chamber; and
a regulating valve which is controlled by the piston and is disposed in said inlet passage upstream of the first chamber;
wherein said resilient load comprises a low rate spring in series with a high rate spring.

4. A flow regulator as in claim 1 wherein said positionally adjustable datum comprises a screw-threaded member.

5. A flow regulator as in claim 4 and comprising a stepper motor for the rotation of the screw-threaded member.

6. A flow regulator as in claim 1 wherein said flow passage includes a flow constrictor.

7. A liquid-flow regulator comprising:
(a) a body defining a first chamber and a second chamber, an inlet passage for the first chamber and an outlet passage for the second chamber;
(b) a regulating valve disposed in the inlet passage;
(c) a piston disposed between the first and second chambers so as to be moveable in response to differential pressure between the chambers;
(d) an orifice connecting the first and second chambers;
(e) a connection between the piston and the valve whereby movement of the piston in response to an increase in the differential pressure tends to close the valve;
(f) a multiple-rate resilient load structure which balances the differential pressure on said piston, the rate increasing as said piston moves in a valve-closing direction;
(g) a bias member disposed to urge said piston to move in said valve-closing direction; and
a lever coupled between the piston and the valve, whereby closure movement of the valve is in an opposite direction to said movement of the piston.

8. A regulator as in claim 7 wherein the lever is disposed to extend transversely of the piston and is pivoted between ends which engage the piston and an operating member for the valve respectively.

9. A liquid-flow regulator as in claim 7 comprising:
(a) a body defining a first chamber and a second chamber, an inlet passage for the first chamber and an outlet passage for the second chamber;
(b) a regulating valve disposed in the inlet passage;
(c) a piston disposed between the first and second chambers so as to be moveable in response to differential pressure between the chambers;
(d) an orifice connecting the first and second chambers;
(e) a connection between the piston and the valve whereby movement of the piston in response to an increase in the differential pressure tends to close the valve;
(f) a multiple-rate resilient load structure which balances the differential pressure on said piston, the rate increasing as said piston moves in a valve-closing direction; and
(g) a bias member disposed to urge said piston to move in said valve-closing direction;
wherein the multiple-rate resilient load structure comprises an adjustable datum member and between said datum member and the piston a compressive assembly comprising a relatively high-rate spring in series with a relatively low rate spring.

10. A regulator as in claim 9 wherein said adjustable datum member is a screw-threaded rod.

11. A regulator as in claim 10 and including a stepper motor for controlled rotation of the screw-threaded rod.

12. A regulator as in claim 9 wherein the compressive assembly comprises a first guide and a second guide between which the high rate spring is disposed, and a third guide slidable within the second guide, the low rate spring being disposed between the second and third guides.

13. A regulator including:
first and second chambers and a flow passage connecting said chambers;
a piston responsive to excess pressure in the first chamber over pressure in the second chamber to move in a valve-closing direction;
a resilient load opposing movement of said piston in said valve-closing direction;
an inlet passage coupled to said first chamber;
a regulating valve which is controlled by the piston and is disposed in said inlet passage upstream of the first chamber;
a lever coupled between the piston and the valve, whereby closure movement of the valve is in an opposite direction to said movement of the piston; and
a bias spring coupled to said piston to urge said piston in the direction for closing said valve.

14. A regulator as in claim 13 wherein said lever is disposed to extend transversely of the piston and is pivoted between ends which engage the piston and an operating member for the valve respectively.

15. A regulator s in claim 13 wherein said resilient load comprises a low rate spring in series with a high rate spring.

16. A regulator as in claim 14 and further comprising an adjustable bias for said resilient load.

17. A liquid-flow regulator comprising:
  (a) a body defining a first chamber and a second chamber, an inlet passage for the first chamber and an outlet passage for the second chamber;
  (b) a regulating valve disposed in the inlet passage;
  (c) a piston disposed between the first and second chambers so as to be moveable in response to differential pressure between the chambers;
  (d) an orifice connecting the first and second chambers;
  (e) a connection between the piston and the valve whereby movement of said piston in response to an increase in the differential pressure tends to close the valve; and
  (f) a positionally adjustable datum member;
  (g) a compressive assembly, comprising a relatively high-rate spring in series with a relatively low rate spring, disposed between said datum member and said piston; and
  (h) a motor coupled to move said positionally adjustable datum member.

18. A regulator as in claim 17 and including a lever coupled between the piston and the valve, whereby closure movement of the valve is in an opposite direction to said movement of the piston.

19. A regulator as in claim 18 wherein the lever is disposed to extend transversely of the piston and is pivoted between ends which engage the piston and an operating member for the valve respectively.

20. A regulator as in claim 17 wherein said adjustable datum member is a screw-threaded rod.

21. A regulator as in claim 20 wherein said motor is a stepper motor coupled for controlled rotation of the screw-threaded rod.

22. A regulator as in claim 17 wherein the compressive assembly comprises a first guide and a second guide between which the high rate spring is disposed, and a third guide slidable within the second guide, the low rate spring being disposed between the second and third guides.

23. A regulator as in claim 17 further comprising a bias spring urging said piston in a direction for closing the valve.

* * * * *